(12) United States Patent
Nam et al.

(10) Patent No.: US 11,530,567 B2
(45) Date of Patent: Dec. 20, 2022

(54) POWER SUPPLY APPARATUS FOR DOOR GLASS FOR VEHICLE

(71) Applicants: Hyundai Motor Company, Seoul (KR); Kia Motors Corporation, Seoul (KR); Pyeong Hwa Automotive Co., Ltd., Daegu (KR)

(72) Inventors: Yong-Hyun Nam, Anyang-si (KR); Jae-Seung Lee, Hwaseong-si (KR); Chung-Sik Yim, Anyang-si (KR); Seung-Sik Han, Hwaseong-si (KR); Dae-Hee Lee, Incheon (KR); Min-Jae Lee, Yongin-si (KR)

(73) Assignees: Hyundai Motor Company, Seoul (KR); Kia Motors Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 99 days.

(21) Appl. No.: 17/203,328

(22) Filed: Mar. 16, 2021

(65) Prior Publication Data
US 2022/0154516 A1    May 19, 2022

(30) Foreign Application Priority Data
Nov. 16, 2020  (KR) .................... 10-2020-0152774

(51) Int. Cl.
*E05F 11/38* (2006.01)
*E05F 15/689* (2015.01)
*B60J 1/17* (2006.01)

(52) U.S. Cl.
CPC .............. *E05F 15/689* (2015.01); *B60J 1/17* (2013.01); *E05Y 2201/684* (2013.01);
(Continued)

(58) Field of Classification Search
CPC .......... E05F 15/689; B60J 1/17; B60J 5/0413; B60J 5/0468; E05Y 2201/684;
(Continued)

(56) References Cited

U.S. PATENT DOCUMENTS

| 2,336,530 | A | * | 12/1943 | Chandler | .............. | E05F 11/423 |
| | | | | | | 49/361 |
| 4,815,984 | A | * | 3/1989 | Sugiyama | ........... | B60R 16/0239 |
| | | | | | | 296/146.7 |

(Continued)

FOREIGN PATENT DOCUMENTS

KR          20190070026 A     6/2019

*Primary Examiner* — Jerry E Redman
(74) *Attorney, Agent, or Firm* — Slater Matsil, LLP

(57) ABSTRACT

A power supply apparatus for a door glass for a vehicle that includes the door glass installed on a door of the vehicle and configured to be movable in an upward and downward direction is provided, wherein an operation module is installed on the door glass to use power, and a power source part is installed on the door. The power supply apparatus includes a rail installed on the door and provided with a rail terminal to electrically conduct with the power source part, and a slider provided with a contactor slidably contacting the rail terminal and electrically conduct with the operation module, while moving in the upward and downward direction integrally with the door glass, wherein the contactor and the rail terminal maintain an electrically conductible state at all times regardless of a change in a position of the door glass.

20 Claims, 19 Drawing Sheets

(52) U.S. Cl.
CPC ..... *E05Y 2201/708* (2013.01); *E05Y 2400/61* (2013.01); *E05Y 2400/654* (2013.01); *E05Y 2600/46* (2013.01); *E05Y 2600/51* (2013.01); *E05Y 2800/428* (2013.01); *E05Y 2900/55* (2013.01)

(58) Field of Classification Search
CPC ........... E05Y 2201/708; E05Y 2400/61; E05Y 2400/654; E05Y 2400/658; E05Y 2600/46; E05Y 2600/51; E05Y 2600/314; E05Y 2800/428; E05Y 2900/55; B60R 16/03; B60R 16/0222; H01R 24/14; H10R 2201/26
USPC .................................................. 49/348, 349
See application file for complete search history.

(56) References Cited

U.S. PATENT DOCUMENTS

| | | | | |
|---|---|---|---|---|
| 4,939,867 A * | 7/1990 | Harada | ................ | E05F 15/689 49/362 |
| 5,537,782 A * | 7/1996 | Klippert | ................ | E05F 15/689 49/358 |
| 6,315,590 B1 * | 11/2001 | Grois | ................ | G02B 6/3897 439/353 |
| 6,406,192 B1 * | 6/2002 | Chen | ................ | H01R 13/6315 439/248 |
| 6,430,874 B1 * | 8/2002 | Korte | ................ | E05F 15/689 49/362 |
| 6,966,149 B2 * | 11/2005 | Fenelon | ................ | E05F 11/385 49/375 |
| 7,213,370 B2 * | 5/2007 | Dedrich | ................ | E05F 11/382 49/358 |
| 7,500,331 B2 * | 3/2009 | Hiramatsu | ........... | E05F 15/689 49/358 |
| 9,399,387 B2 * | 7/2016 | Kuhnen | ...................... | B60J 3/04 |
| 10,230,195 B2 * | 3/2019 | Klein | .................... | E05F 15/689 |
| 10,427,504 B2 * | 10/2019 | Mueller | ................ | E05F 15/665 |
| 10,439,321 B2 * | 10/2019 | Klein | .................... | E05F 11/385 |
| 10,654,343 B2 * | 5/2020 | Kang | ...................... | H02J 50/80 |
| 10,858,875 B2 * | 12/2020 | Reul | ..................... | H01R 12/771 |
| 10,899,298 B2 * | 1/2021 | Kang | ...................... | B60J 1/2016 |
| 10,946,729 B2 * | 3/2021 | Kang | ........................ | B60J 3/04 |
| 11,318,818 B2 * | 5/2022 | Arimoto | ............... | E05F 15/689 |
| 2001/0052203 A1 * | 12/2001 | Doshita | ............... | B60R 16/0215 49/502 |
| 2006/0042167 A1 * | 3/2006 | Dedrich | ................ | E05F 15/689 49/358 |
| 2006/0059782 A1 * | 3/2006 | Garcia | ................ | B60R 16/0215 49/358 |
| 2006/0207183 A1 * | 9/2006 | Hiramatsu | ............ | E05F 15/689 49/358 |
| 2009/0178340 A1 * | 7/2009 | Noritsugu | ............ | H02G 11/006 49/358 |
| 2014/0238967 A1 * | 8/2014 | Boyce | ...................... | B60P 1/00 219/203 |
| 2014/0247473 A1 * | 9/2014 | Kuhnen | ...................... | B60J 1/17 359/238 |
| 2018/0090876 A1 * | 3/2018 | Klein | ................. | H01R 13/5841 |
| 2018/0095586 A1 * | 4/2018 | Cho | ...................... | H04N 5/232945 |
| 2019/0176582 A1 | 6/2019 | Kang | | |

\* cited by examiner

POWER SUPPLY APPARATUS FOR DOOR GLASS FOR VEHICLE

CROSS-REFERENCE TO RELATED APPLICATIONS

This application claims priority to Korean Patent Application No. 10-2020-0152774, filed on Nov. 16, 2020, which application is hereby incorporated herein by reference.

TECHNICAL FIELD

The present disclosure relates to a power supply apparatus for a door glass for a vehicle.

BACKGROUND

A door of a vehicle is mounted with a door glass for lighting and ventilation.

Since the door glass is transparent, a tinting film is attached to the door glass for protecting privacy, reducing solar radiation quantity, blocking UV rays, and the like.

Meanwhile, in recent years, various technologies for freely adjusting the concentration of the tinting film have been tried. Further, a technology has been tried to use the door glass to display information like a display, or allow the passenger's touch to be input like a touch panel.

To perform such a technology, the power required for operating the door glass should be provided.

However, since the door glass is installed to be moved upward and downward by a regulator installed on the door for ventilation, the power is not easily supplied. As a proposal of supplying power to the door glass which moves upward and downward, a wireless power transmission system may be adopted, but the cost is excessively increased. Further, as the location of the door glass is changed by the moving upward and downward of the door glass, the power may not be transmitted when the locations of a transmission module and a reception module are changed. Further, there is a problem in that it is difficult to apply the wireless power transmission system to the actual vehicle because the assembling is not easy due to the size of the wireless power transmission system and the regulations related to electromagnetic waves are not satisfied.

The contents described in this section are to help the understanding of the background of the present disclosure, and may include what is not previously known to those skilled in the art to which the present disclosure pertains.

SUMMARY

The present disclosure relates to a power supply apparatus for a door glass for a vehicle. Particular embodiments relate to a power supply apparatus for a door glass for a vehicle, which may supply power to the door glass installed on a door of a vehicle regardless of whether the door glass moves upward and downward.

The present disclosure may solve problems in the related art, and embodiments of the present disclosure provide a power supply apparatus for a door glass for a vehicle, which may supply power to the door glass regardless of the moving upward and downward of the door glass.

A power supply apparatus for a door glass for a vehicle according to embodiments of the present disclosure includes, in the power supply apparatus for the door glass for the vehicle including the door glass installed on a door of the vehicle to be movable upward and downward, an operation module installed on the door glass to use power, and a power source part installed on the door, a rail installed on the door in the moving upward and downward direction of the door glass and provided with a rail terminal electrically conducting with the power source part, and a slider provided with a contactor slidably contacting the rail terminal and electrically conducting with the operation module, while moving upward and downward integrally with the door glass, in which the contactor and the rail terminal maintain the electrically conductible state at all times according to the change in the location of the door glass.

The rail is installed on a door inner panel of the door in the moving upward and downward direction of the door glass, and a part of the slider is installed inside the rail to be movable upward and downward.

The rail terminal is installed inside the rail in the longitudinal direction of the rail and electrically conducts with the power source part, the contactor is installed to be electrically conductible with a slider terminal installed inside the slider, and a portion adjacent to the end of the contactor is formed to be convex toward the rail terminal and elastically supported toward the rail terminal, such that the contactor is in contact with the rail terminal in the slidable state.

The rail is formed in the cross section having a part of the upper surface opened, and the slider includes a connector connected to the operation module to be electrically conductible with each other, a sliding part accommodated inside the rail, and a neck part connecting the connector to the sliding part and penetrating the upper surface of the rail.

The rail terminal is formed on the inner upper surface of the rail in the longitudinal direction of the rail, and the contactor is installed on the upper surface of the sliding part.

The power supply apparatus for the door glass for the vehicle further includes a slider cover covering the upper surface of the rail, and a rubber made of an elastic material, provided in a space between the slider cover and the upper surface of the rail in the longitudinal direction of the rail, and installed to be in close contact with the neck part from the slider cover.

A pair of rubbers are provided to face each other to be in close contact with both side surfaces of the neck part, and a portion in which the slider is located is in close contact with both side surfaces of the neck part according to the sliding of the slider and in a portion in which the slider is not located, the ends of the rubbers are in close contact with each other to be watertight.

The power supply apparatus for the door glass for the vehicle further includes an upper rail cover installed above the door inner panel of the door, and coupled to the upper end of the rail, and a lower rail cover installed below the upper rail cover in the door inner panel, and coupled to the lower end of the rail.

At least one of the upper rail cover and the lower rail cover has a rail cover terminal, which connects the power source part to the rail to be electrically conductible, inserted therein.

The lower rail cover has the rail cover terminal, which electrically conducts the power source part and the rail terminal, inserted therein.

Each of the upper rail cover and the lower rail cover is provided with a damper on one side thereof.

A cable, which is drawn out from the power source part to electrically conduct with the rail terminal, is provided, and a portion where the cable is drawn out from the power source part is surrounded by a grommet for watertightness.

The power supply apparatus for the door glass for the vehicle further includes a holder accommodating the lower end of the door glass, and a cursor fastened to the holder, having a connector of the slider fitted therein, and connected to the holder to be electrically conductible, in which the operation module electrically conducts with the holder, and the slider electrically conducts with the cursor.

The holder includes a glass accommodating part accommodating the lower end of the door glass, and a holder terminal inserted into the holder, and electrically conducting with the operation module.

The cursor is formed with a socket, into which the connector of the slider is inserted, on one side thereof, and has a slider terminal installed inside the slider and a cursor terminal electrically conducting the holder terminal inserted therein.

A fastening hole having a screw thread formed in the inner circumferential surface is formed in the holder, a through hole is formed in the cursor to penetrate the cursor, and a fastening bolt is fastened to the fastening hole in the state where the fastening hole and the through hole coincide with each other, and the holder and the cursor are fastened.

The end of the holder terminal inserted into the holder is formed to be exposed toward the cursor at a location adjacent to the fastening hole, the end of the cursor terminal inserted into the cursor is formed to be exposed toward the holder at a location adjacent to the through hole, and when the holder and the cursor are fastened, the holder terminal and the cursor terminal are electrically conductible with each other.

A watertightness pad is further provided outside the holder terminal and the cursor terminal in the holder and the cursor.

One side of the holder is formed with a fixing part protruding from the holder, and a holder accommodating part accommodating the fixing part is formed in the cursor.

The power source part is an inverter.

The power supply apparatus for the door glass for the vehicle according to embodiments of the present disclosure having the above configuration may stably supply power to the door glass from the inverter installed on the door of the vehicle regardless of the moving upward and downward of the door glass.

Further, it is possible to save the cost compared to the wireless power transmission system, to reduce the size, and to satisfy the electromagnetic wave condition, such that the power supply apparatus is advantageously applied to the actual vehicle.

Further, since the power supply apparatus for the door glass for the vehicle has the watertightness available structure, it is possible to prevent short circuit or electrical leakage due to water even if the water permeates into the door.

DETAILED DESCRIPTION OF ILLUSTRATIVE EMBODIMENTS

Figure 1:
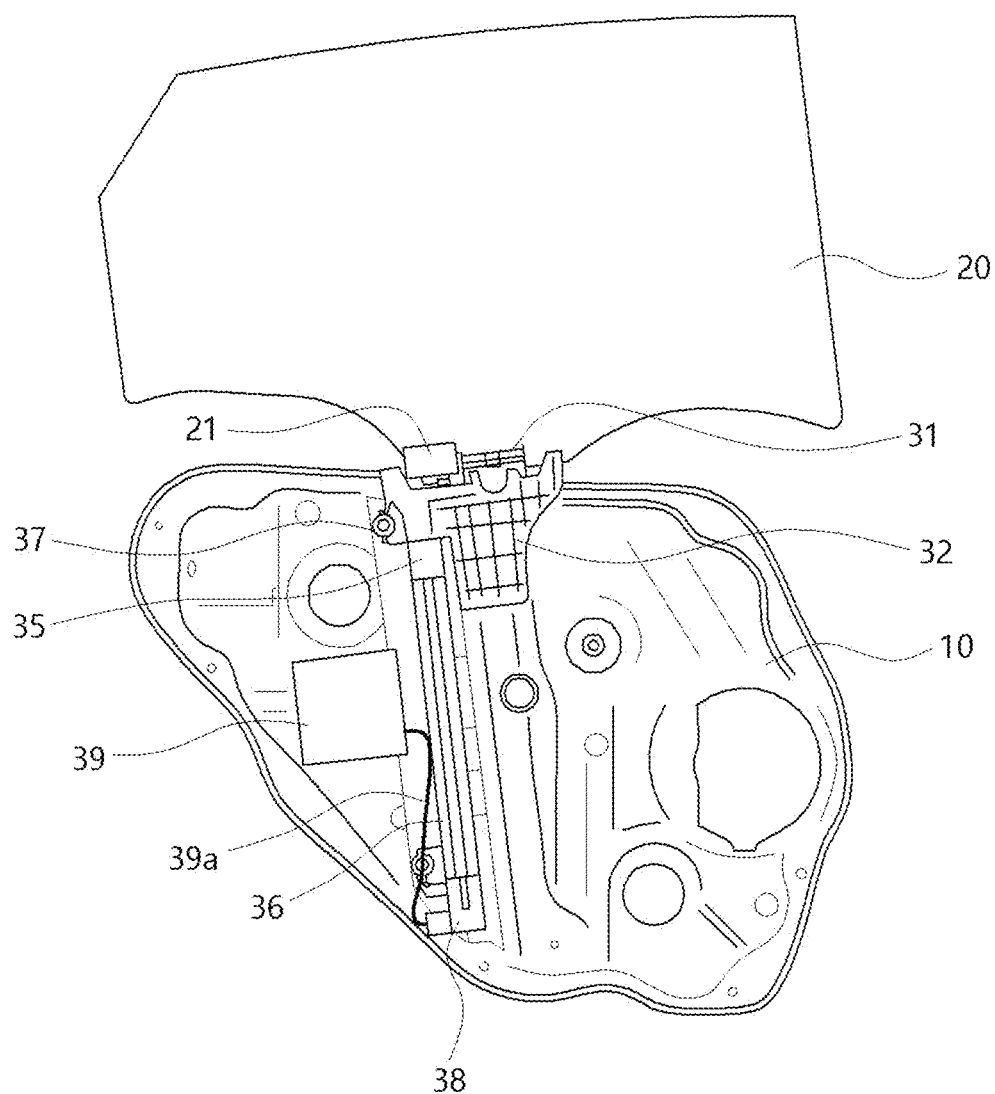
FIG. 1 is a schematic diagram illustrating a power supply apparatus for a door glass for a vehicle according to embodiments of the present disclosure.
Figure 2:
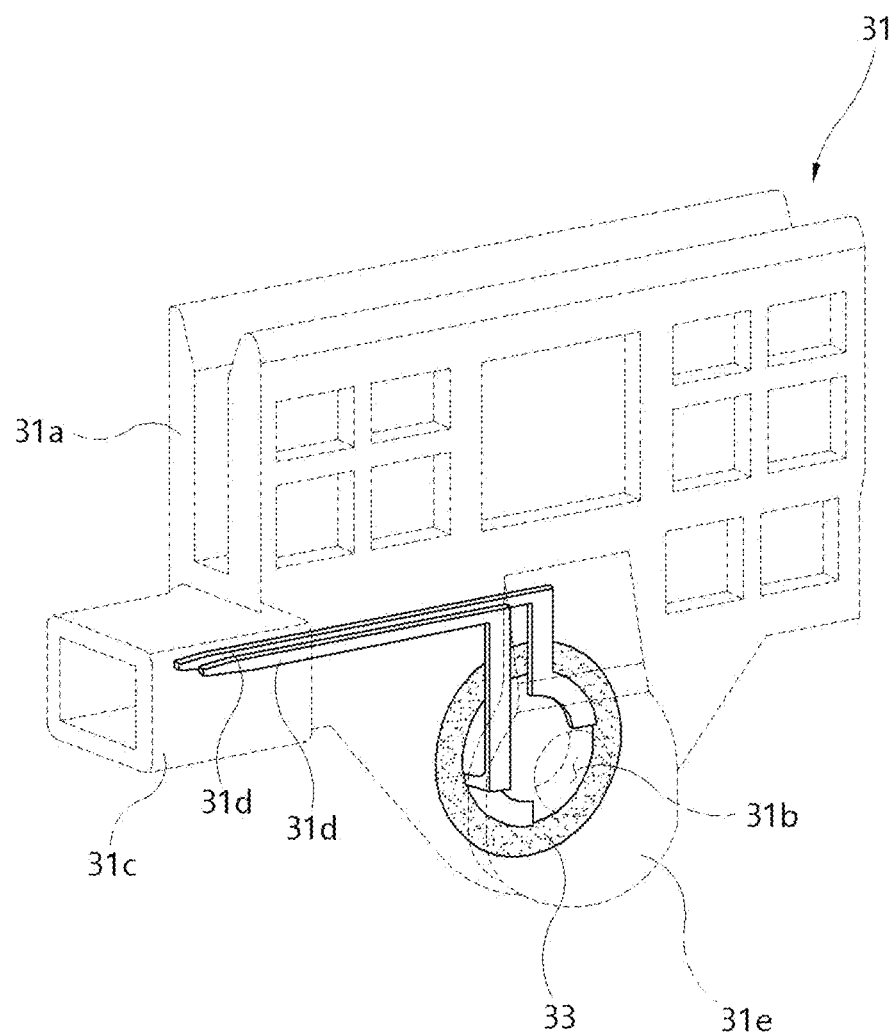
FIG. 2 is a perspective diagram illustrating a holder in the power supply apparatus for the door glass for the vehicle according to embodiments of the present disclosure.
Figure 3:
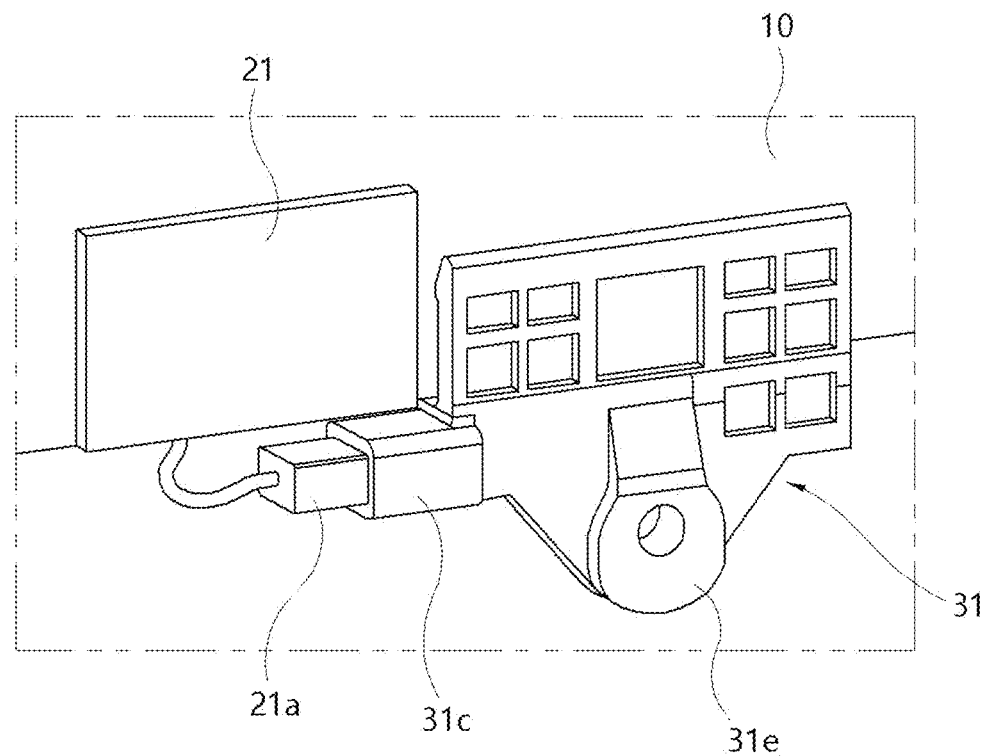
FIG. 3 is a perspective diagram illustrating the state where the holder and the door glass are fastened in the power supply apparatus for the door glass for the vehicle according to embodiments of the present disclosure.
Figure 4:
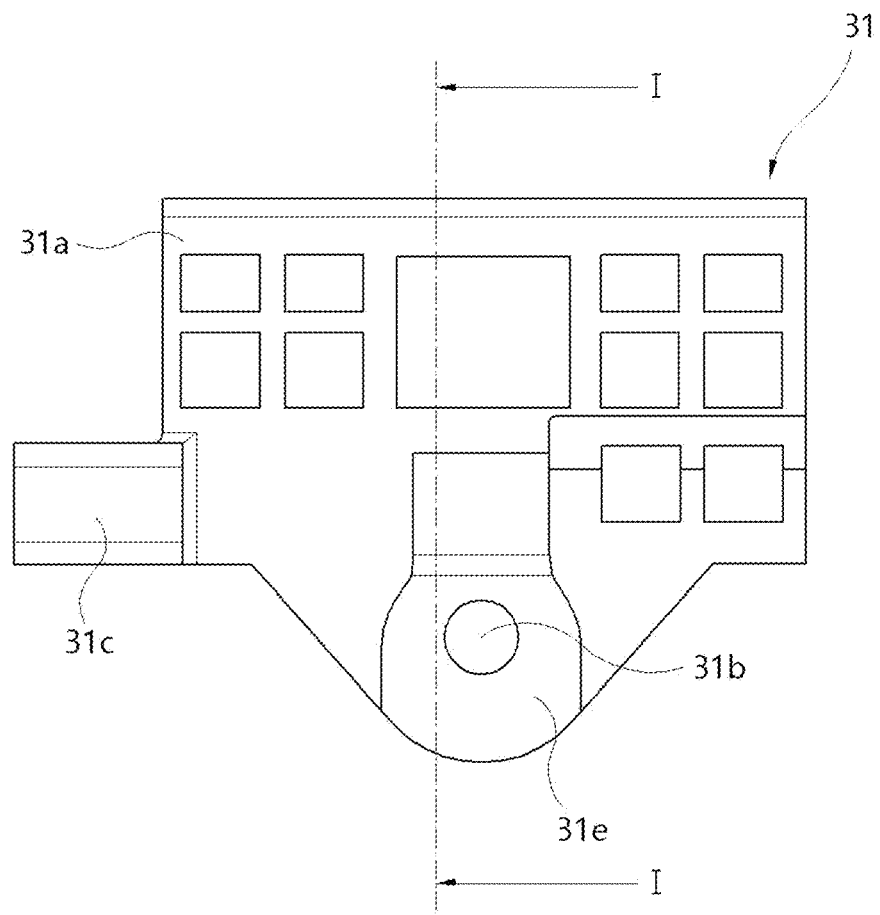
FIG. 4 is a front diagram illustrating the holder in the power supply apparatus for the door glass for the vehicle according to embodiments of the present disclosure.
Figure 5:
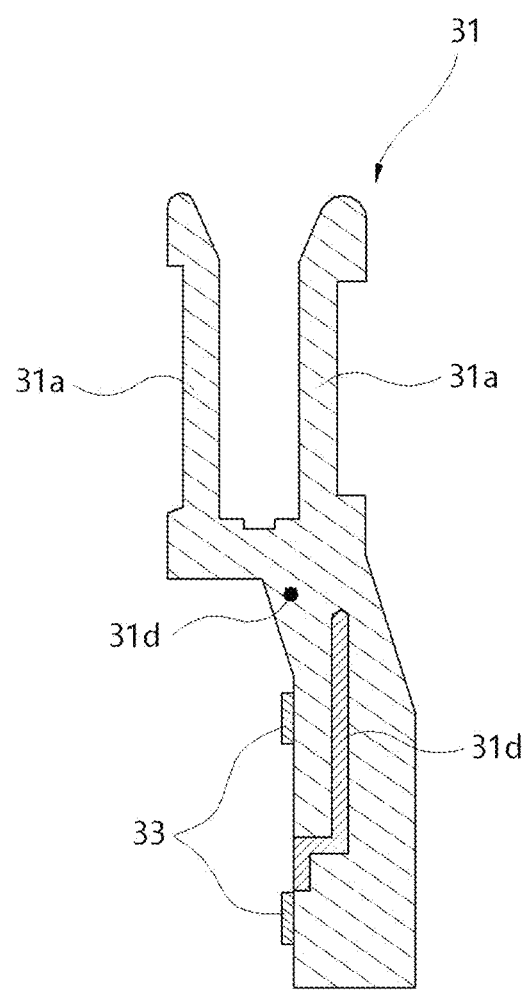
FIG. 5 is a cross-sectional diagram taken along the line I-I illustrated in FIG. 4.
Figure 6:
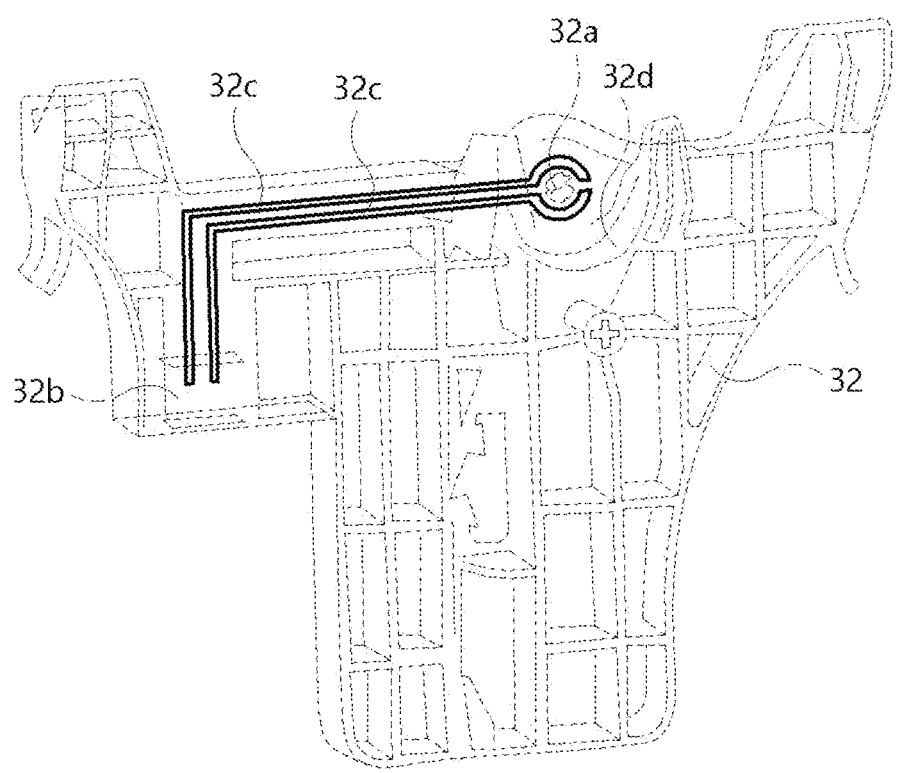
FIG. 6 is a perspective diagram illustrating a cursor in the power supply apparatus for the door glass for the vehicle according to embodiments of the present disclosure.
Figure 7:
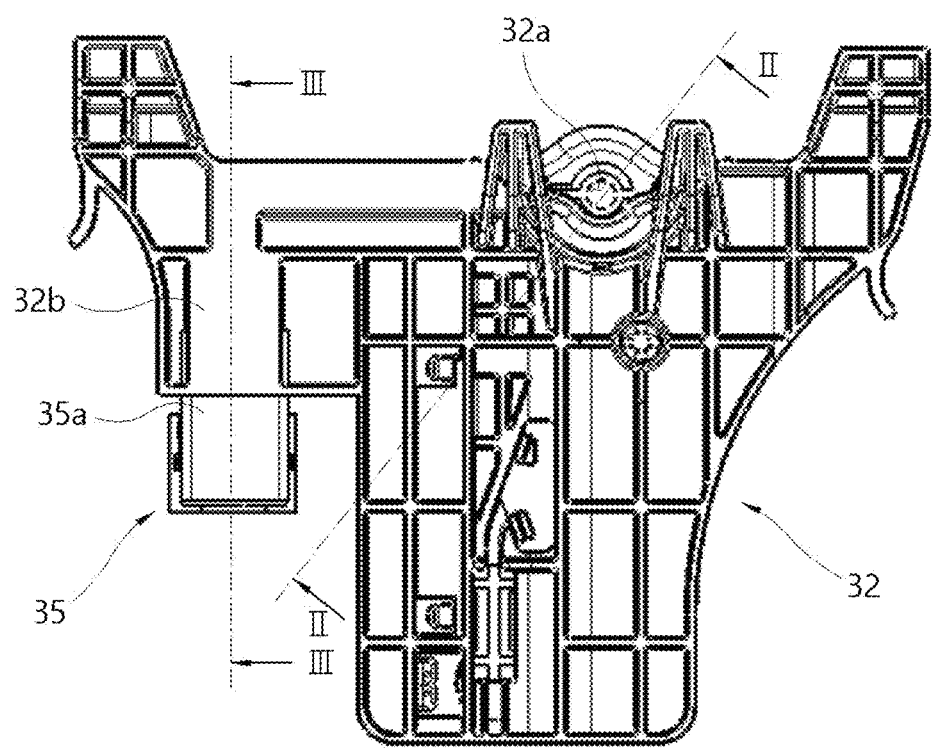
FIG. 7 is a front diagram illustrating the cursor in the power supply apparatus for the door glass for the vehicle according to embodiments of the present disclosure.
Figure 8:
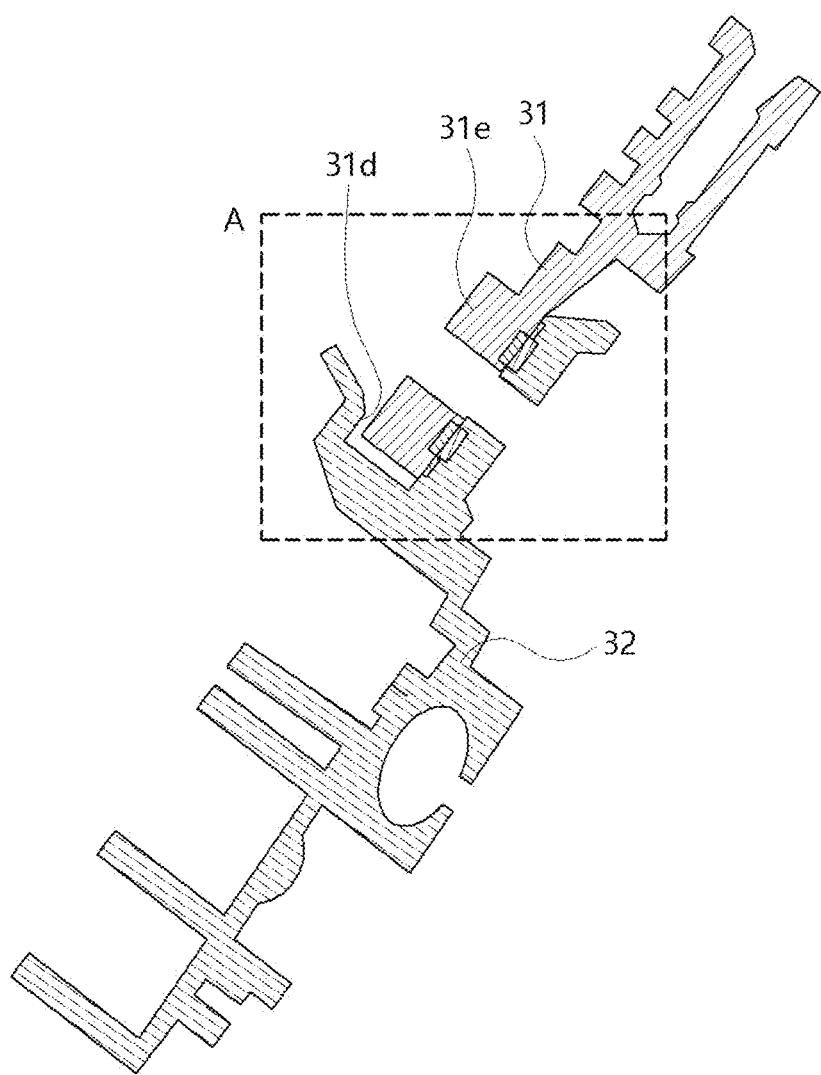
FIG. 8 is a cross-sectional diagram taken along the line II-II illustrated in FIG. 7.

Hereinafter, a power supply apparatus for a door glass for a vehicle according to embodiments of the present disclosure will be described in detail with reference to the accompanying drawings.

A power supply apparatus for a door glass for a vehicle according to embodiments of the present disclosure includes a door glass 20 installed on a door of a vehicle to be movable upward and downward, an operation module 21 installed on the door glass 20 to use power, a rail 36 installed on the door in the moving upward and downward direction of the door glass 20 and provided with a rail terminal 36a electrically conducting with a power source part 39, in the power supply apparatus for the door glass for the vehicle including the power source part 39 installed on the door, and a slider 35 slidably contacting the rail terminal 36a and provided with a contactor 35e electrically conducting with the operation module 21, while moving upward and downward integrally with the door glass 20, in which the contactor 35e and the rail terminal 36a are configured to maintain the electrically conductible state at all times according to the change in the location of the door glass 20.

The door glass 20 is mounted on the door of the vehicle. A door inner panel 10 of the door is mounted with a regulator (not illustrated) capable of moving the door glass 20 upward and downward, and the door glass 20 moves upward and downward by the regulator.

The operation module 21 is mounted on the door glass 20 to consume power upon operation. The operation module 21 may be a tinting film capable of adjusting the concentration, a display displaying an image, a touch panel input by the user, or the like. The operation module 21 should receive the power required for operation from the power source part 39 for the vehicle.

To this end, an embodiment of the present disclosure provides a structure of connecting from the power source part 39 to the operation module 21 in a wired manner regardless of the location of the door glass 20.

FIG. 1 illustrates a power supply apparatus for a door glass for a vehicle according to an exemplary embodiment of the present disclosure viewed from the outside of the vehicle.

A holder 31 is fastened to the lower end of the door glass 20.

The holder 31 includes a glass accommodating part 31a accommodating the door glass 20, a fastening hole 31b used when being fastened to a cursor 32, a socket 31c into which a power source connector 21a is inserted, a plurality of holder terminals 31d provided inside the holder 31, and a fixing part 31e protruding from the holder 31.

The glass accommodating part 31a is formed to grip a part of the lower end of the door glass 20. The lower end of the door glass 20 is inserted into the glass accommodating part 31a, such that the holder 31 is fastened to the door glass 20.

The fastening hole 31b is formed to penetrate the holder 31 below the glass accommodating part 31a in the holder 31. The fastening hole 31b is screw-coupled by inserting a fastening bolt 34 when being fastened to the cursor 32. To this end, a screw thread is formed on the inner circumferential surface of the fastening hole 31b.

The socket 31c is formed on one side of the holder 31. The socket 31c has the power source connector 21a, which is connected to be electrically conductible with the operation module 21 mounted on the door glass 20, inserted therein.

The holder terminal 31d is inserted into the holder 31. Since the holder 31 is formed by the injection, the holder 31 is formed by the insert injection in the state where the pre-molded holder terminal 31d is inserted into a molding. A plurality of holder terminals 31d is provided. At least two holder terminals 31d are formed and located inside the holder 31 in the mutually insulated state. The holder terminal 31d has one end located on the socket 31c, and extends to the inside to have the other end located to be adjacent to the circumference of the fastening hole 31b. At this time, the other end of the holder terminal 31d is exposed to the outside from the circumference of the fastening hole 31b for the electrical connection with the cursor 32 side.

The power source connector 21a is inserted into the socket 31c, such that the holder 31 and the door glass 20 are connected to be electrically conductible with each other.

The fixing part 31e is formed to protrude from the circumference of the fastening hole 31b in the direction perpendicular to the holder 31.

The cursor 32 is fastened to the holder 31, and in contact with the lower end of the door glass 20 to support the door glass 20. The central portion of the upper end of the cursor 32 is fastened to the holder 31, and both ends thereof support the lower end of the door glass 20, respectively.

The cursor 32 or the assembly of the cursor 32 and the holder 31 is fixed to the regulator (not illustrated) installed inside the door, and the door glass 20 also moves upward and downward together while the cursor 32 or the assembly of the cursor 32 and the holder 31 moves upward and downward according to the operation of the regulator.

The cursor 32 is formed with a through hole 32a for fastening with the holder 31. The fastening bolt 34 for fastening with the holder 31 penetrates through the through hole 32a formed in the cursor 32.

One side of the cursor 32 is formed with the socket 32b into which the slider 35 is inserted.

A cursor terminal 32C for power transmission is provided inside the cursor 32. The cursor terminal 32c has one end located on the socket 32b, and the other end located to be adjacent to the circumference of the through hole 32a. The cursor terminal 32C is formed such that the through hole 32a extends from the socket 32b. A plurality of cursor terminals 32c are also provided like the holder terminal 31d, and the cursor terminal 32c and the holder terminal 31d are provided in the same number.

The cursor 32 and the holder 31 are fastened through the fastening bolt 34. The holder accommodating part 32d accommodating the fixing part 31e is formed on the cursor 32 and the cursor 32 and the holder 31 are fastened by using the fastening bolt 34 in the state where the fixing part 31e is located inside the holder accommodating part 32d. The holder 31 is placed on the cursor 32 by allowing the fixing part 31e to be accommodated in the holder accommodating part 32d to match the fastening hole 31b and the through hole 32a. Then, the fastening bolt 34 penetrates the through hole 32a to be screw-coupled with the holder 31 in the fastening hole 31b, such that the holder 31 and the cursor 32 are fastened.

Figure 9:
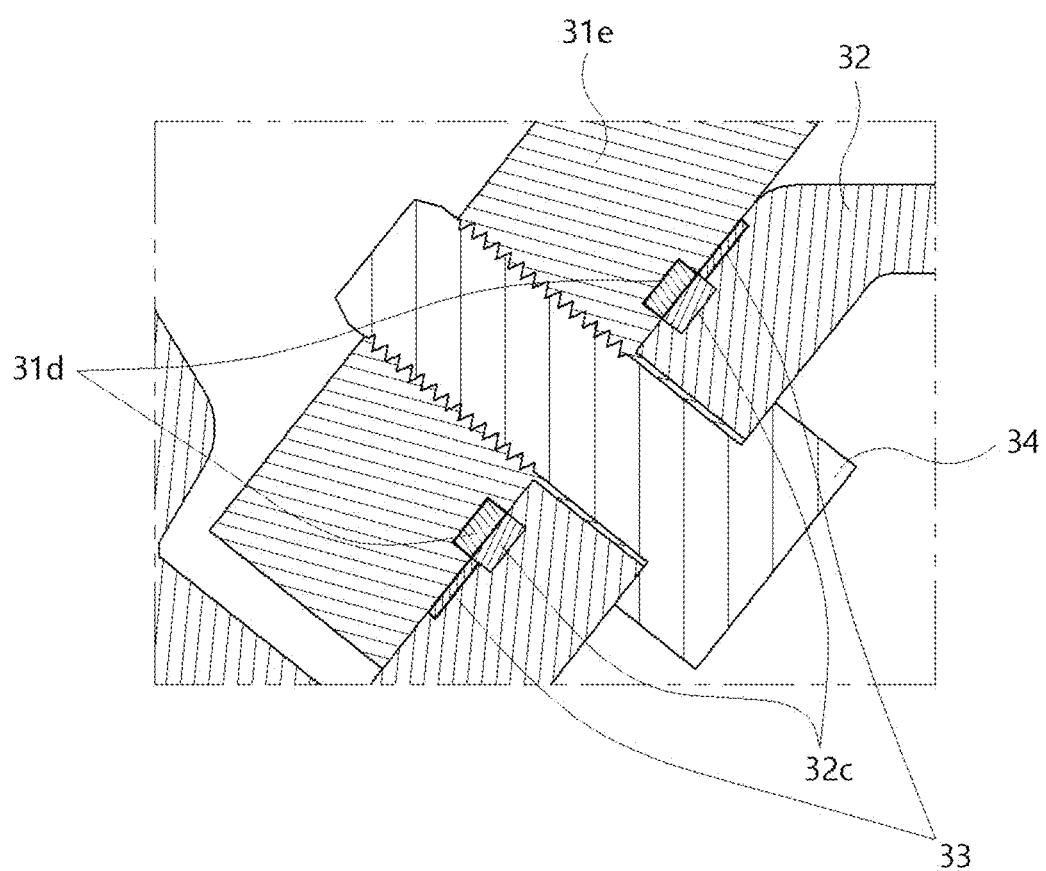
FIG. 9 is an enlarged diagram of a portion A illustrated in FIG. 8.
Figure 10:
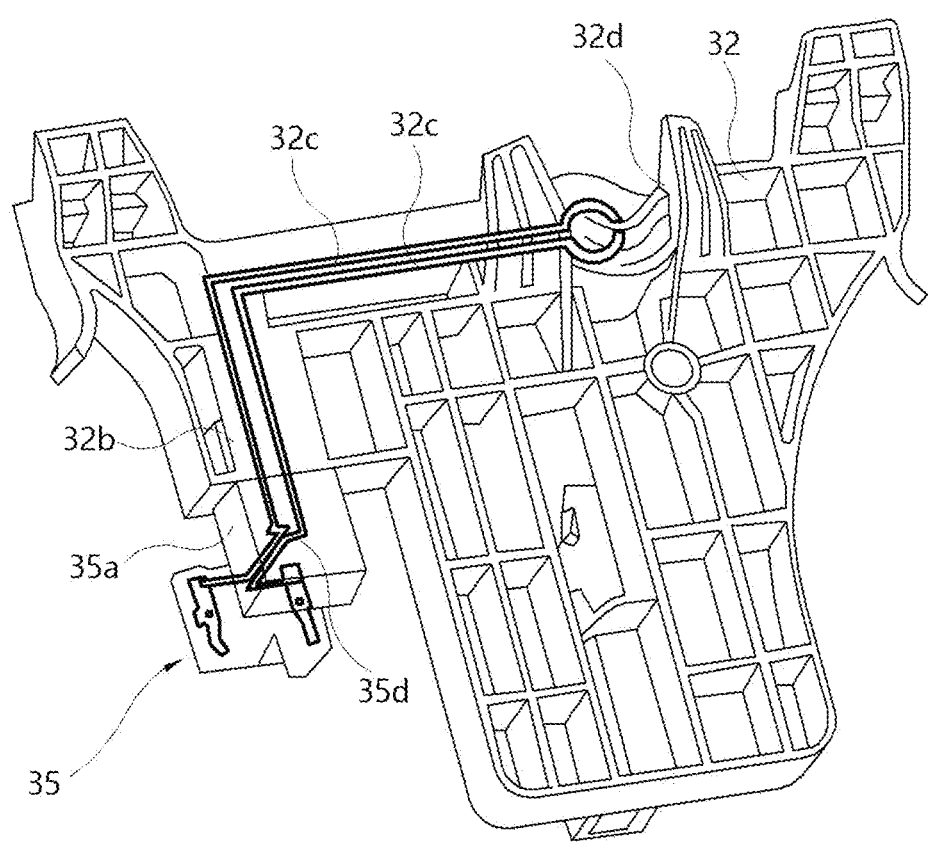
FIG. 10 is a perspective diagram illustrating the state where the cursor and a slider are fastened in the power supply apparatus for the door glass for the vehicle according to embodiments of the present disclosure.
Figure 11:
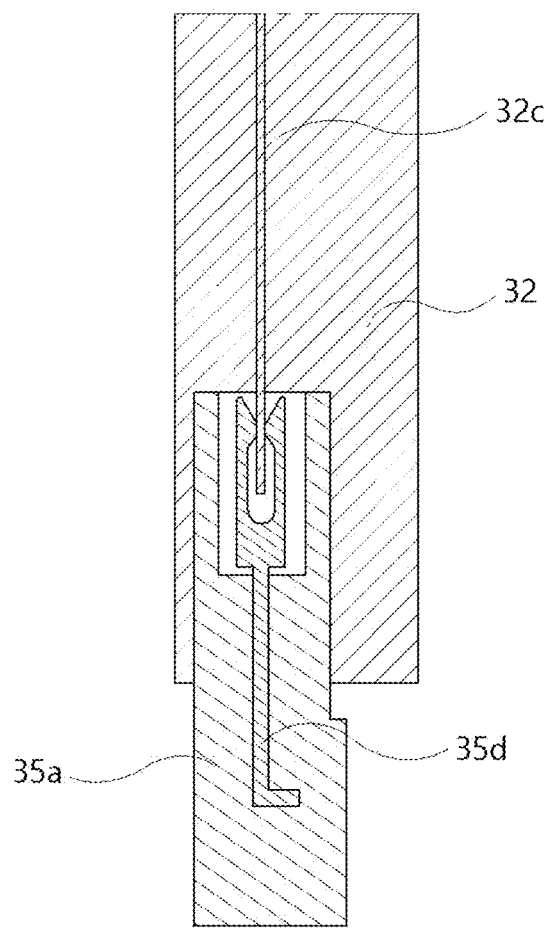
FIG. 11 is a cross-sectional diagram taken along the line III-III illustrated in FIG. 7.
Figure 12:
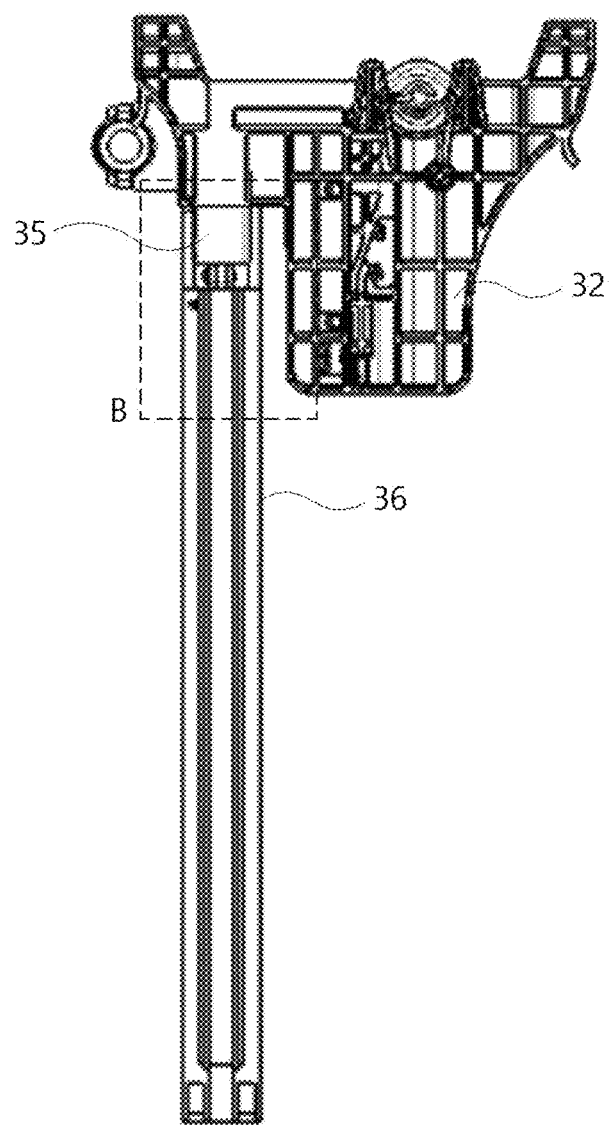
FIG. 12 is a front diagram illustrating the state where the cursor, the slider, and a rail are fastened in the power supply apparatus for the door glass for the vehicle according to embodiments of the present disclosure.
Figure 13:
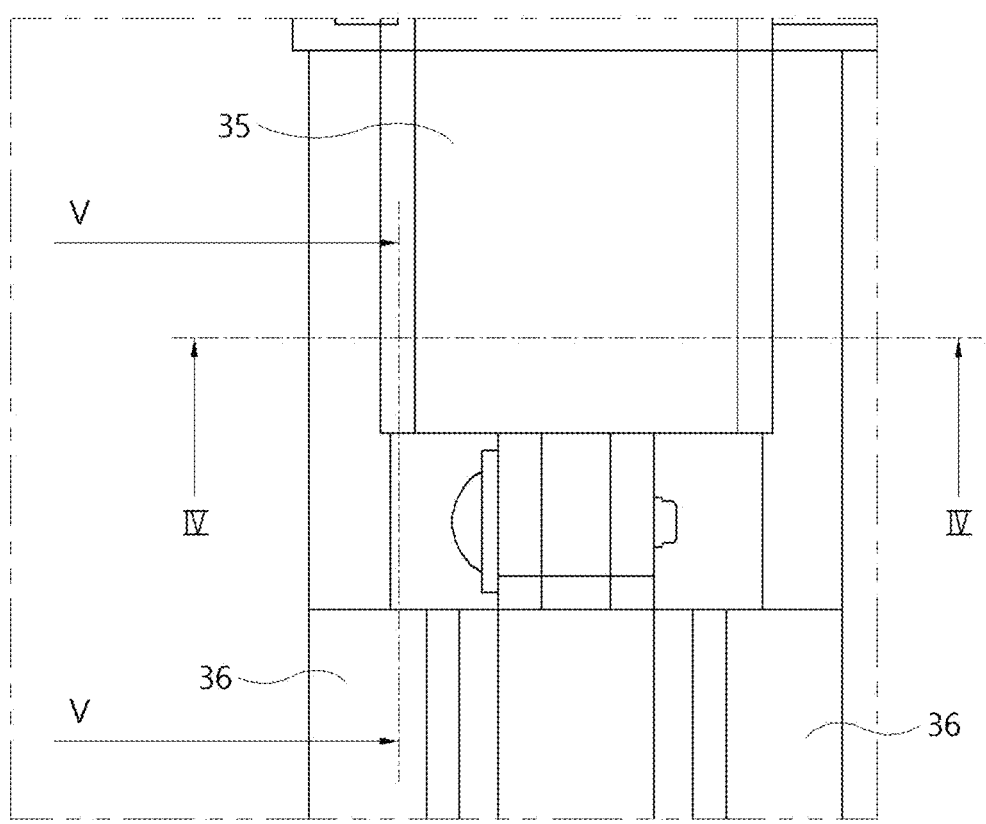
FIG. 13 is an enlarged diagram of a portion B illustrated in FIG. 12.
Figure 14:
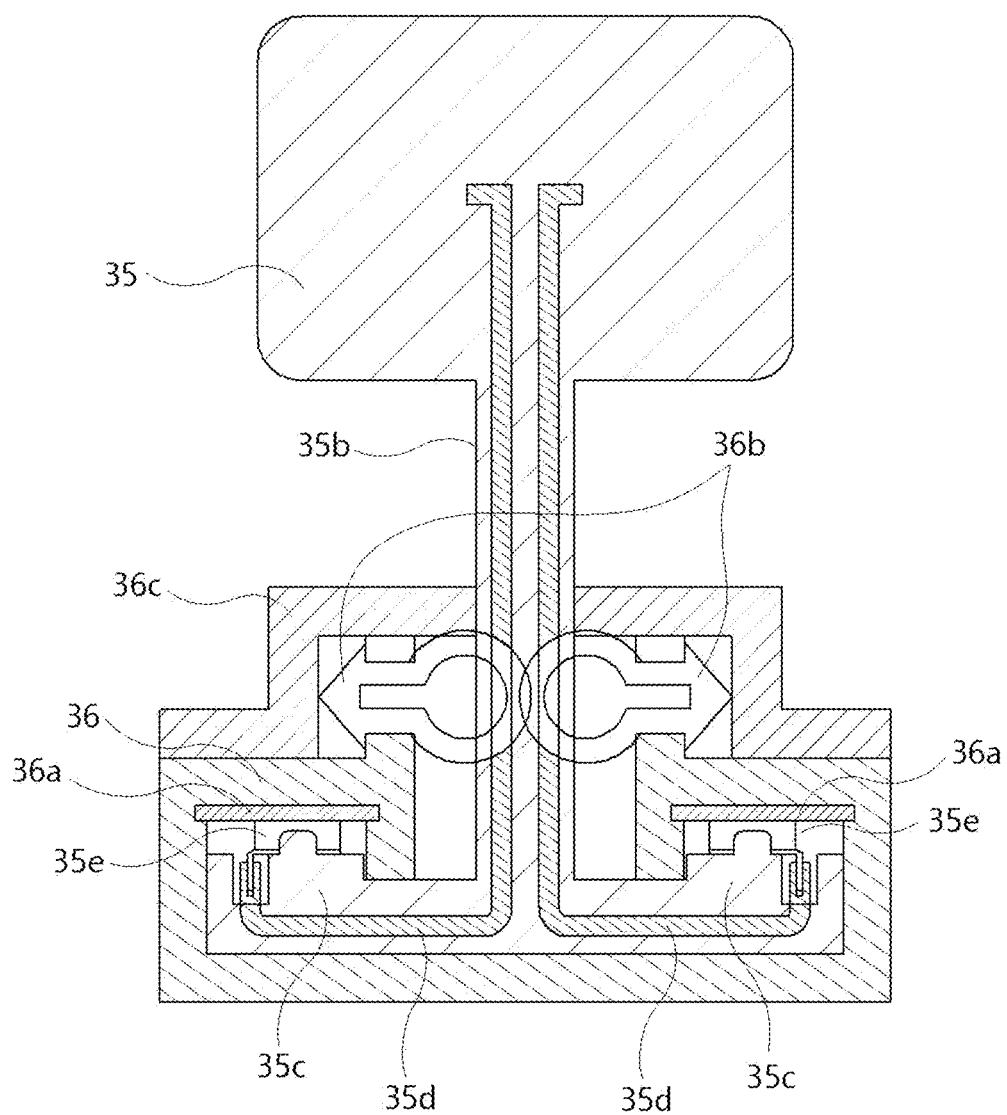
FIG. 14 is a cross-sectional diagram taken along the line IV-IV illustrated in FIG. 13.
Figure 15:
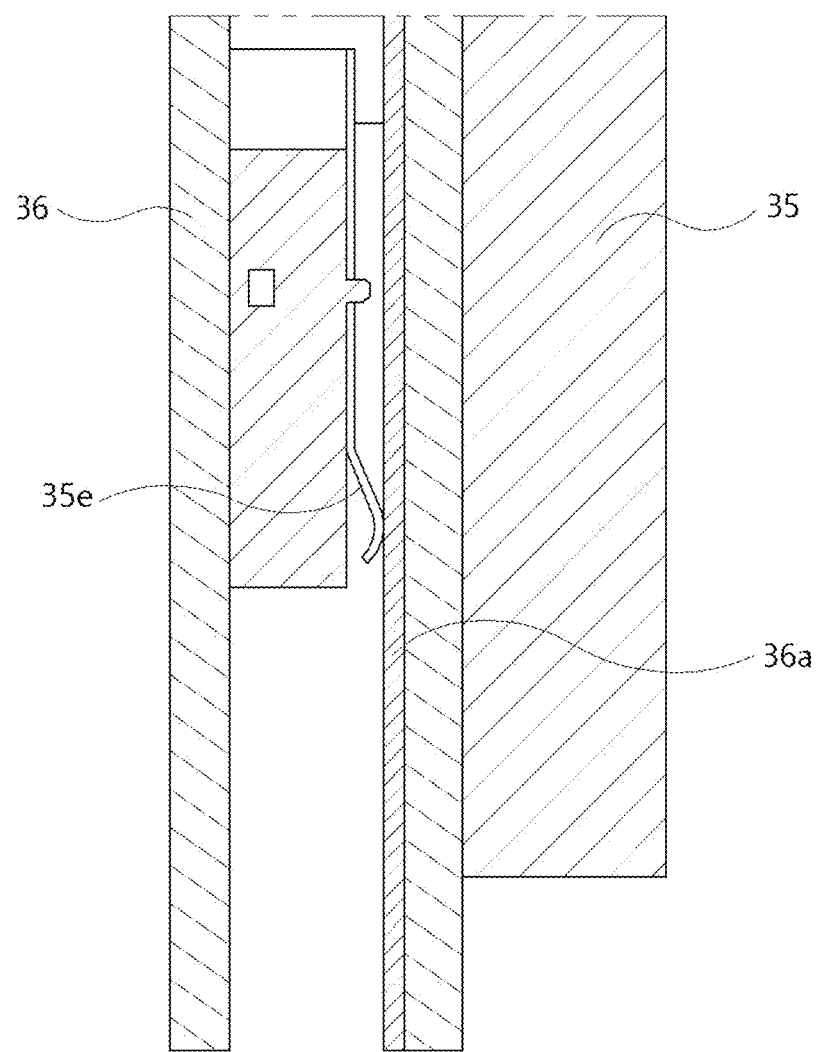
FIG. 15 is a cross-sectional diagram taken along the line V-V illustrated in FIG. 13.

At this time, as illustrated in FIG. 9, when the holder 31 and the cursor 32 are placed, the holder terminal 31d and the cursor terminal 32c are in contact with each other to be connected to be electrically conductible with each other.

Meanwhile, to prevent water from permeating between the holder 31 and the cursor 32, a watertightness pad 33 is adopted outside a portion to which the holder terminal 31d or the cursor terminal 32C is exposed. The watertightness pad 33 prevents the water introduced into the door upon raining or washing from permeating into the contact surface between the holder terminal 31d and the cursor terminal 32c.

The holder 31 and the cursor 32 are also components of the regulator for moving the door glass 20 upward and downward.

The slider 35 is inserted into the socket 32b formed on the cursor 32 and slides in the state of being in contact with the rail 36 fixedly installed on the door inner panel 10 while moving upward and downward together with the cursor 32. As the slider 35 maintains the state of being in contact with the rail 36 even if the door glass 20 moves upward and downward, power may be supplied to the door glass 20, which moves upward and downward.

The slider 35 includes the connector 35a inserted into the socket 32b formed on the cursor 32, a neck part 35b penetrating the rail 36, the sliding part 35c located inside the rail 36, a slider terminal 35d formed to extend from the connector 35a to the sliding part 35c, and the contactor 35e bonded to the slider terminal 35d and elastically contacting the rail terminal 36a formed on the rail 36.

The connector 35a is located on the upper portion of the slider 35, and inserted into the socket 32b of the cursor 32.

The neck part 35b is formed to extend downward from the connector 35a. The neck part 35b is formed thinner than the connector 35a or the sliding part 35c and installed on the rail to penetrate the rail 36.

The sliding part 35c is formed on the lower end of the neck part 35b. The sliding part 35c is guided by the rail 36, such that the slider 35 easily moves upward and downward.

The slider terminal 35d is formed to extend from the connector 35a to the sliding part 35c. The slider terminal 35d is inserted in advance when the slider 35 is injected and thus located inside the slider 35. The slider terminal 35d has the upper end exposed to one side of the connector 35a to be electrically connected to the cursor terminal 32C to be electrically conductible with the cursor terminal 32c, and the lower end exposed to one side of the sliding part 35c.

The contactor 35e is connected to the slider terminal 35d. The contactor 35e has one end connected to the slider terminal 35d, the middle portion fixed to the sliding part 35c, and the other end fastened to the sliding part 35c in the form of being spaced apart from the sliding part 35c. The contactor 35e is fitted into a projection protruding from the sliding part 35c, such that the contactor 35e is fastened to the sliding part 35c. The contactor 35e is made of a metallic material having elasticity, and as the other end thereof is spaced apart from the sliding part 35c, the slider terminal 35d and the rail terminal 36a are connected to be electrically conductible with each other as the other end of the contactor 35e or a portion adjacent to the other end is elastically in contact with the rail terminal 36a. Particularly, to allow the contactor 35e to easily slide in the rail terminal 36a in the state of being in contact with the rail terminal 36a, the end of the contactor 35e is formed to be convex toward the rail terminal 36a.

The rail 36 is installed on the door inner panel 10 in the moving upward and downward direction of the door glass 20.

The cross-sectional surface of the rail 36 is constantly formed in the longitudinal direction of the rail 36. A part of the upper surface of the rail 36 is opened such that the neck part 35b of the slider 35 is located, and the remainder thereof accommodates the sliding part 35c of the slider 35, such that the slider 35 slides in the longitudinal direction of the rail 36.

The rail 36 is provided with the rail terminal 36a on the inner upper surface thereof. The rail terminal 36a is in contact with the slider terminal 35d to be connected to be electrically conductible with the slider terminal 35d. Since the end of the slider terminal 35d is elastically formed to be in contact with the rail terminal 36a, the slider terminal 35d is in contact with the rail terminal 36a at all times regardless of the location of the slider 35. The rail 36 and the slider 35 are connected to maintain the electrically conductible state at all times according to such a structure, such that the electrically conductible state is maintained at all times regardless of which place the door glass 20, which moves upward and downward, is located.

The upper portion of the rail 36 is provided with a rubber 36b, and a slider cover 36c accommodating the rubber 36b is fastened to the rail 36.

The rubber 36b is provided such that the front end of the rubber 36b is in contact with the neck part 35b of the slider 35. Since the rubber 36b is made of an elastic material such as synthetic rubber, the front end of the rubber 36b may be easily deformed, such that the front end of the rubber 36b is in close contact with the neck part 35b to be watertight. The rubbers 36b are installed to be located on both sides of the neck part 35b, respectively. Meanwhile, when the slider 35 moves, the watertightness may be maintained as the rubbers 36b are in contact with each other even if the neck part 35b between the rubbers 36b are removed.

The slider cover 36c is coupled to the upper surface of the rail 36 to secure a space in which the rubber 36b may be installed. The slider cover 36c is also formed with an opening or a slit in the longitudinal direction of the rail 36 such that the neck part 35b penetrates the slider cover 36c.

An upper rail cover 37 and a lower rail cover 38 are installed on the door inner panel 10.

The upper rail cover 37 and the lower rail cover 38 are installed on the door inner panel 10 in the state of being vertically spaced apart from each other, and the upper end and lower end of the rail 36 are accommodated in and fixed to the upper rail cover 37 and the lower rail cover 38, respectively. Dampers 37a, 38a for insulating vibration are provided on one side of the upper rail cover 37 and the lower rail cover 38, respectively, and a bolt penetrates the dampers 37a, 38a to be fastened to the door inner panel 10, such that the upper rail cover 37 and the lower rail cover 38 are installed on the door inner panel 10.

A rail cover terminal 38c for connecting the inverter 39 and the rail 36 to at least one of the upper rail cover 37 and the lower rail cover 38 to be electrically conductible is provided therein.

Figure 16:
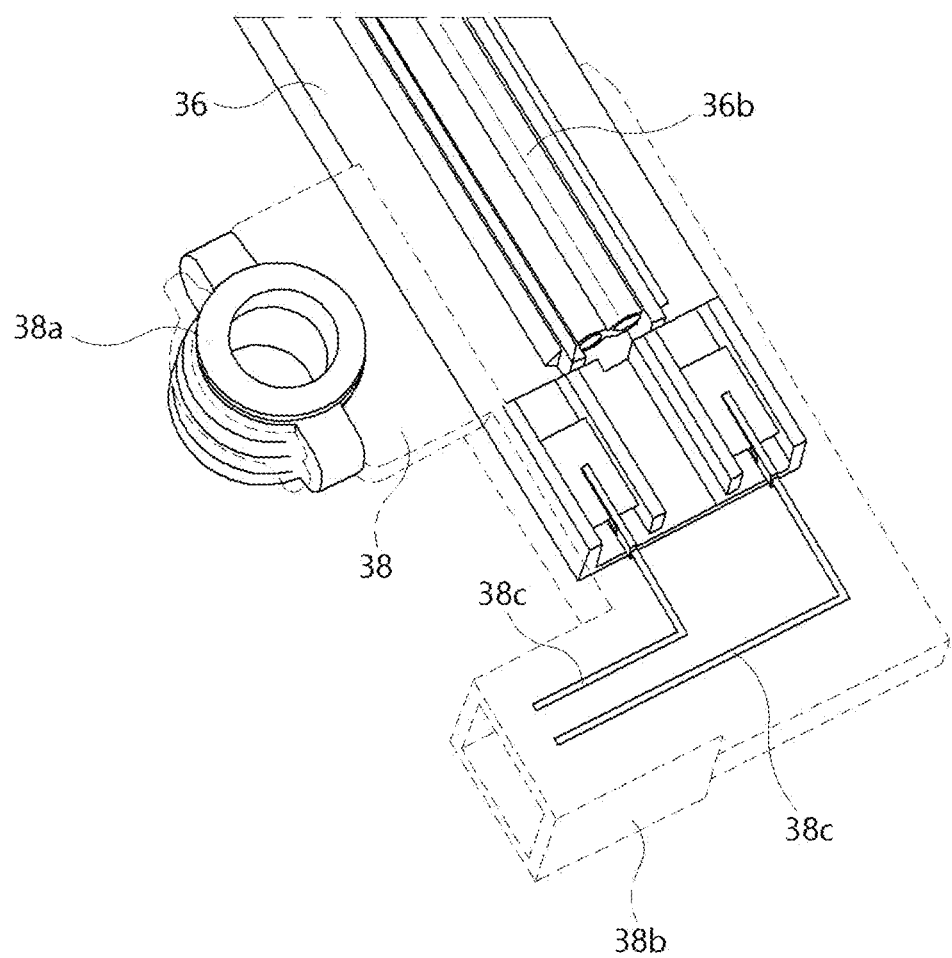
FIG. 16 is a perspective diagram illustrating the state where the rail and a lower rail cover are fastened in the power supply apparatus for the door glass for the vehicle according to embodiments of the present disclosure.

Preferably, the rail cover terminal 38c is provided on the lower rail cover 38. That is, as illustrated in FIG. 16, the lower rail cover 38 is insert-injected in the state of the rail cover terminal 38c being inserted into the lower rail cover 38 when the lower rail cover 38 is injected, such that the rail cover terminal 38c is provided inside the lower rail cover 38.

Figure 17:
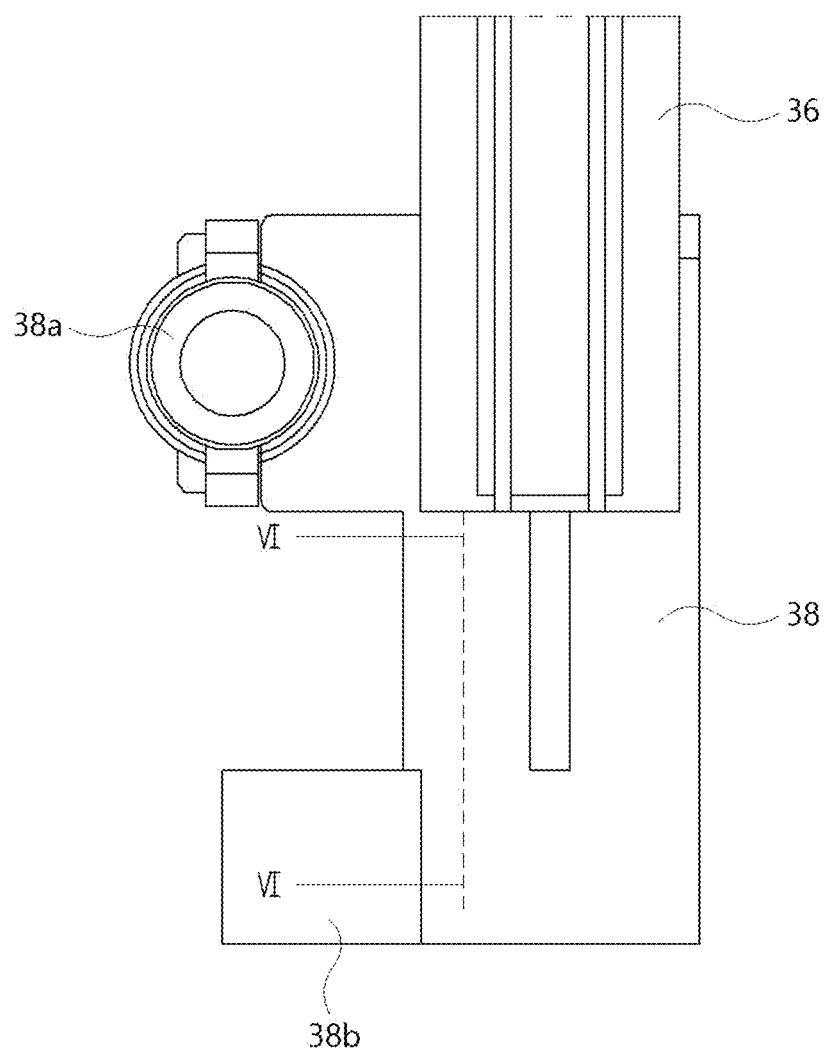
FIG. 17 is a front diagram illustrating the state where the rail and the lower rail cover are fastened in the power supply apparatus for the door glass for the vehicle according to embodiments of the present disclosure.
Figure 18:
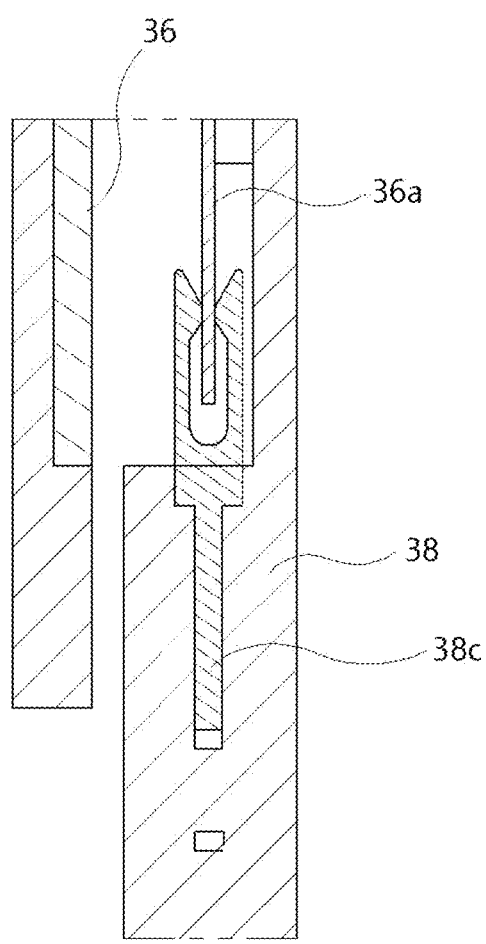
FIG. 18 is a cross-sectional diagram taken along the line VI-VI illustrated in FIG. 17.
Figure 19:
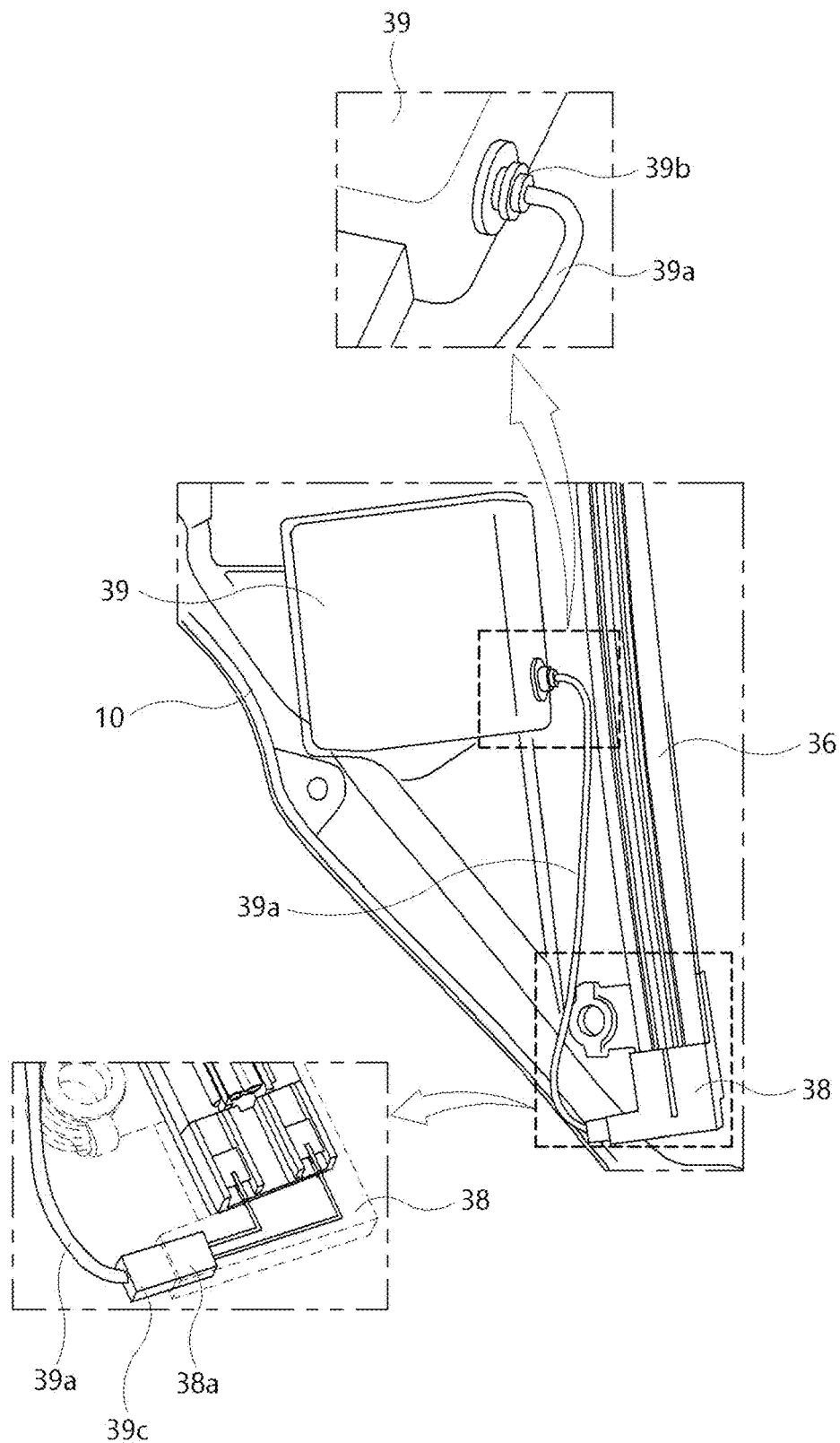
FIG. 19 is a perspective diagram illustrating a portion in which the lower rail cover and an inverter are connected in the power supply apparatus for the door glass for the vehicle according to embodiments of the present disclosure.

The rail cover terminal 38c has one end connected to the inverter 39, and the other end connected to the rail terminal 36a to be electrically conductible. When the lower rail cover 38 is fitted into the end of the rail 36 and the rail 36 and the lower rail cover 38 are coupled, the rail terminal 36a and the rail cover terminal 38c are coupled to be electrically conductible with each other (see FIG. 17).

The inverter 39 is an example of the power source part supplying power to the door glass 20 from the vehicle. The inverter 39 is installed on the door inner panel 10. The inverter 39 becomes a source of the power supplied to the door glass 20. The inverter 39 serves to amplify a voltage. A control module for controlling power supply, as necessary may be provided inside the inverter 39.

The power output from the inverter 39 is supplied to the door glass 20 through the lower rail cover 38, the rail 36, the slider 35, the cursor 32, and the holder 31 which are connected to maintain the state of being electrically conductible with each other.

To this end, the inverter 39 is connected to the lower rail cover 38 to be electrically conductible. The connector 39c is formed on the end of a cable 39a connected to the inverter 39, and the connector 39c is inserted into the socket 38b formed on the lower rail cover 38, such that the inverter 39 is connected to the lower rail cover 38 to be electrically conductible.

Meanwhile, for the watertightness between the inverter 39 and the cable 39a, a grommet 39b is provided on a portion where the cable 39a is drawn out from the inverter 39.

At least two holder terminals 31d, cursor terminals 32c, slider terminals 35d, rail terminals 36a, and rail cover terminals 38c are provided, respectively. When only the power is simply supplied, two are provided, but when a ground is applied, three are provided, and when a control signal is also transmitted, three or more are provided.

Further, all of the holder terminal 31*d*, the cursor terminal 32*c*, the slider terminal 35*d*, the rail terminal 36*a*, and the rail cover terminal 38*c* are made of a metallic material, which is a conductor.

What is claimed is:

1. A power supply apparatus for a door glass for a vehicle that comprises the door glass installed on a door of the vehicle, the door glass being configured to be movable in an upward and downward direction, wherein an operation module is installed on the door glass and configured to use power, and a power source part is installed on the door, the power supply apparatus comprising:
   a rail installed on the door in the upward and downward direction of the door glass and provided with a rail terminal configured to electrically conduct with the power source part; and
   a slider provided with a contactor slidably contacting the rail terminal and configured to electrically conduct with the operation module, while moving in the upward and downward direction integrally with the door glass,
   wherein the contactor and the rail terminal are configured to maintain an electrically conductible state at all times regardless of a change in a position of the door glass.

2. The power supply apparatus of claim 1, wherein:
   the rail is installed on a door inner panel of the door in the upward and downward direction of the door glass; and
   a part of the slider is installed inside the rail to be movable upward and downward.

3. The power supply apparatus of claim 1, wherein:
   the rail terminal is installed inside the rail in a longitudinal direction of the rail and is configured to electrically conduct with the power source part;
   the contactor is configured to be electrically conductible with a slider terminal installed inside the slider; and
   a portion adjacent to an end of the contactor is convex in shape and faces toward the rail terminal and elastically supported toward the rail terminal, such that the contactor is in contact with the rail terminal in a slidable state.

4. The power supply apparatus of claim 1, wherein:
   the rail has a part of an upper surface opened in a cross sectional view; and
   the slider comprises a connector connected to the operation module and configured to be electrically conductible, a sliding part accommodated inside the rail, and a neck part connecting the connector to the sliding part and penetrating the upper surface of the rail.

5. The power supply apparatus of claim 4, wherein:
   the rail terminal is provided on an inner upper surface of the rail in a longitudinal direction of the rail; and
   the contactor is installed on an upper surface of the sliding part.

6. The power supply apparatus of claim 4, further comprising:
   a slider cover covering the upper surface of the rail; and
   a rubber made of an elastic material provided in a space between the slider cover and the upper surface of the rail in a longitudinal direction of the rail and installed to be in close contact with the neck part from the slider.

7. The power supply apparatus of claim 6, further comprising a pair of rubbers facing each other in close contact with both side surfaces of the neck part, wherein a portion in which the slider is located is in close contact with both side surfaces of the neck part according to a sliding of the slider and in a portion in which the slider is not located, ends of the pair of rubbers are in close contact with each other to be watertight.

8. The power supply apparatus of claim 1, further comprising a cable drawn out from the power source part to electrically conduct with the rail terminal, wherein a portion where the cable is drawn out from the power source part is surrounded by a grommet for watertightness.

9. The power supply apparatus of claim 1, wherein the power source part is an inverter.

10. A power supply apparatus for a door glass for a vehicle, the vehicle comprising the door glass installed on a door of the vehicle and configured to be movable in an upward and downward direction, an operation module installed on the door glass and configured to use power, and a power source part installed on the door, the power supply apparatus comprising:
    a rail installed on the door in the upward and downward direction of the door glass and provided with a rail terminal configured to electrically conduct with the power source part;
    a slider provided with a contactor slidably contacting the rail terminal and configured to electrically conduct with the operation module, while moving in the upward and downward direction integrally with the door glass;
    an upper rail cover installed above an inner panel of the door and coupled to an upper end of the rail; and
    a lower rail cover installed below the upper rail cover in the inner panel of the door and coupled to a lower end of the rail,
    wherein the contactor and the rail terminal are configured to maintain an electrically conductible state at all times regardless of a change in a position of the door glass.

11. The power supply apparatus of claim 10, wherein the upper rail cover or the lower rail cover has a rail cover terminal inserted therein, the rail cover terminal configured to connect the power source part to the rail to be electrically conductible.

12. The power supply apparatus of claim 10, wherein the lower rail cover has a rail cover terminal inserted therein, the rail cover terminal configured to connect the power source part to the rail to be electrically conductible and to electrically conduct the power source part and the rail terminal.

13. The power supply apparatus of claim 10, wherein each of the upper rail cover and the lower rail cover is provided with a damper on one side thereof.

14. A power supply apparatus for a door glass for a vehicle, the vehicle comprising the door glass installed on a door of the vehicle and configured to be movable in an upward and downward direction, an operation module installed on the door glass and configured to use power, and a power source part installed on the door, the power supply apparatus comprising:
    a rail installed on the door in the upward and downward direction of the door glass and provided with a rail terminal configured to electrically conduct with the power source part;
    a slider provided with a contactor slidably contacting the rail terminal and configured to electrically conduct with the operation module, while moving in the upward and downward direction integrally with the door glass;
    a holder accommodating a lower end of the door glass; and
    a cursor fastened to the holder having a connector of the slider fitted therein, the cursor connected to the holder to be electrically conductible;
    wherein the operation module is configured to electrically conduct with the holder, and the slider is configured to electrically conduct with the cursor; and wherein the contactor and the rail terminal are configured to maintain an electrically conductible state at all times regardless of a change in a position of the door glass.

15. The power supply apparatus of claim 14, wherein the holder comprises:
   a glass accommodating part accommodating the lower end of the door glass; and
   a holder terminal inserted into the holder and configured to electrically conduct with the operation module.

16. The power supply apparatus of claim 15, wherein the cursor includes a socket into which the connector of the slider is inserted on one side thereof, the power supply apparatus further comprising a slider terminal installed inside the slider and a cursor terminal configured to electrically conduct the holder terminal inserted therein.

17. The power supply apparatus of claim 16, further comprising:
   a fastening hole having a screw thread formed in an inner circumferential surface formed in the holder;
   through hole formed in the cursor and penetrating the cursor; and
   a fastening bolt fastened to the fastening hole in a state where the fastening hole and the through hole coincide with each other, wherein the holder and the cursor are fastened.

18. The power supply apparatus of claim 17, wherein:
   an end of the holder terminal inserted into the holder is exposed toward the cursor at a location adjacent to the fastening hole;
   an end of the cursor terminal inserted into the cursor is exposed toward the holder at a location adjacent to the through hole; and
   when the holder and the cursor are fastened, the holder terminal and the cursor terminal are configured to be electrically conductible with each other.

19. The power supply apparatus of claim 18, further comprising a watertightness pad provided outside the holder terminal and the cursor terminal in the holder and the cursor.

20. The power supply apparatus of claim 14, wherein:
   one side of the holder is formed with a fixing part protruding from the holder; and
   a holder accommodating part accommodating the fixing part is formed in the cursor.

* * * * *